United States Patent

Choi et al.

[11] Patent Number: 5,824,766
[45] Date of Patent: Oct. 20, 1998

[54] POLYAMIDEAMIC ACID RESIN PREPOLYMERS, HIGH HEAT RESISTANT POLYAMIDEIMIDE FOAMS PREPARED THEREFROM, AND PROCESSES FOR PREPARING THEM

[75] Inventors: Kil-Yeong Choi; Mi-Hie Yi; Moon-Young Jin; Young-Taik Hong, all of Daejeon, Rep. of Korea

[73] Assignee: Korea Research Institute of Chemical Technology, Daejeon, Rep. of Korea

[21] Appl. No.: 586,972

[22] Filed: Jan. 16, 1996

[30] Foreign Application Priority Data

Jan. 16, 1995 [KR] Rep. of Korea ................. 1995-795

[51] Int. Cl.$^6$ ................................................. C08G 73/10
[52] U.S. Cl. ................. 528/350; 528/128; 528/173; 528/220; 528/229; 528/310; 528/322; 521/184; 521/185; 521/189
[58] Field of Search .................. 528/350, 128, 528/229, 220, 173, 310, 322; 521/189, 184, 185

[56] References Cited

U.S. PATENT DOCUMENTS

| | | | |
|---|---|---|---|
| 4,041,065 | 8/1977 | Lindberg et al. | 528/350 |
| 4,045,407 | 8/1977 | Keske et al. | 528/350 |
| 4,115,372 | 9/1978 | Onder | 528/73 |
| 4,296,208 | 10/1981 | Gagliani et al. | |
| 4,305,796 | 12/1981 | Gagliani et al. | |
| 4,332,656 | 6/1982 | Gagliani et al. | |
| 4,543,368 | 9/1985 | Smearing et al. | |
| 4,738,990 | 4/1988 | Nelb, II et al. | 521/108 |

*Primary Examiner*—P. Hampton-Hightower
*Attorney, Agent, or Firm*—Vorys, Sater, Seymour and Pease

[57] ABSTRACT

A polyamideamic acid resin prepolymer represented by formula A having isophorone diamine as one of monomers,

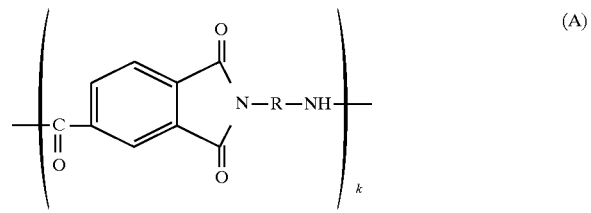

(A)

-continued

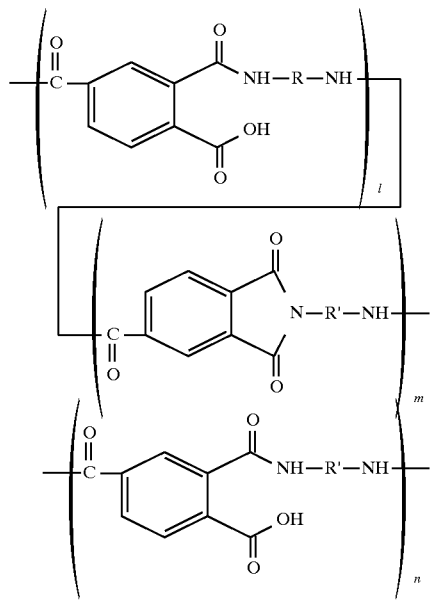

in which
k, l, m and n are integer of 1 or more, respectively, and $$0.1 < \frac{k+m}{k+l+m+n} < 0.9,$$

—R— is at least one group selected from the group consisting of

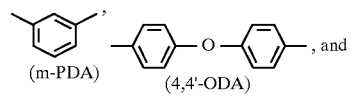

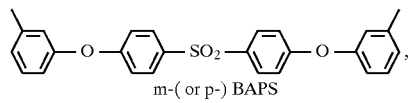

—R'— is a cis- and trans-conformational mixture of

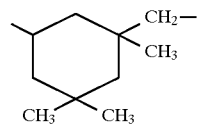

high heat resistant polyamideimide foam produced therefrom, and processes for producing them are disclosed.

6 Claims, 4 Drawing Sheets

POLYAMIDEAMIC ACID RESIN PREPOLYMERS, HIGH HEAT RESISTANT POLYAMIDEIMIDE FOAMS PREPARED THEREFROM, AND PROCESSES FOR PREPARING THEM

FIELD OF THE INVENTION

The present invention relates to novel polyamideamic acid resin prepolymers, polyamideimide foams prepared therefrom, and processes for preparing them. More specifically, it relates to a process for preparing new type of foams having excellent mechanical properties as well as heat resistance.

BACKGROUND OF THE INVENTION

Polymer foams are, in general, light weight materials wherein stable bubbles are dispersed in polymers. Most of foams developed hitherto have use temperatures of 100° to 150° C., which restrict their usage. Recently, however, heat resistant foams have come to appear with the development of various kinds of high heat resistant polymers. Examples of typical heat resistant foams include polyisocyanurates, polybenzimidazoles and polyimides represented by formula I, II and III respectively:

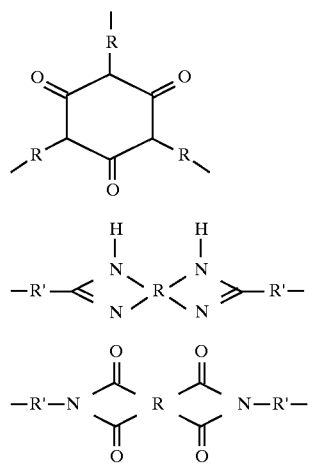

which are all heterocycles.

Advantages and drawbacks of typical high heat resistant foams are listed in the following Table 1. In particular, polyimides resin foams are regarded as one of the most applicable materials by virtue of their excellent heat stability and flame retardancy, and thus many researches have been devoted to improving physical properties and to simplifing preparing process of polyimides resin foams.

TABLE 1

| Typical high heat resistant foams | | |
|---|---|---|
| sort | advantage | drawback |
| polyisocyanurate | good mechanical property, flame retardancy and morphological stability inexpensive raw material | poor heat resistance |
| polybenzimidazole (PBI) | excellent heat resistance (decomposition temperature: 510 to 570° C.) | poor oxidation resistance cost expensive process complicated |
| polyimide | excellent heat resistance | cost expensive |

TABLE 1-continued

| Typical high heat resistant foams | | |
|---|---|---|
| sort | advantage | drawback |
| (PI) | and flame retardance good electrical property low water vapor permeation rate | process complicated |

Polyimides foams are produced by heating oligomer resin having good flowability in thermal oven or microwave oven as mentioned in U.S. Pat. No. 4,296,208, U.S. Pat. No. 4,305,796 and U.S. Pat. No. 4,332,656. During the above mentioned procedure, chain extension reaction and foaming reaction occur at the same time. Accordingly, the above mentioned method has drawbacks in that the manufacture process is too complicated and the decomposition of cells happens easily. On the other hand, in the case of polyetherimides foams which have greatly improved flowability than that of polyimides resins does, it is known that they are produced by continuous foaming process in extruder due to low melt viscosity of polyetherimides resins as disclosed in U.S. Pat. No. 4,543,368. However, polyetherimides foams have demerit of having inferior heat resistance to polyimides foams since the glass transition temperatures of polyetherimides foams are around 201° C.

Polyamideimides resins are expected to be useful base resins of the new high heat resistant foams since they have more excellent heat resistance than polyetherimides resins and greatly improve melt processing property compared with polyimides resins. However, polyamideimides resins developed and commercially available until now have too high melt viscosity to be prepared into foams.

There is, therefore, a need to provide further novel high heat resistant polyamideimides resins which have melt viscosity property suitable for preparing foams, good heat resistance, mechanical property, and ease of melt molding process while maintaining the existing properties of polyamideimides resins, and can be used as major heat resistant materials in aerospace, shipping and varieties of advanced industries.

The present inventors have made extensive researches to find new polyamideimides resins having good heat resistance and melt flowability. As a result, the present inventors have found that by modifying the structure of conventional polyamideimides resins by using aromatic diamine and alicyclic diamine together as diamine monomers to obtain prepolymers for preparing novel high heat resistant foams having greatly improved melt casting processability, and thereby have developed a process for producing foams in the new form from the obtained prepolymers. The present invention has been accomplished on the basis of this finding.

SUMMARY OF THE INVENTION

It is an object of the invention to provide novel polyamideamic acid resin prepolymers.

It is another object of the invention to provide polyamideimide foams prepared from the new prepolymer.

It is yet another object of the invention to provide a process for preparing new foams having excellent mechanical properties as well as heat resistance.

It is still another object of the invention to provide a process for producing polyamideamic acid resin prepolymers.

Other objects and advantages will be apparent to those of ordinary skill in the art from the following descriptions and drawings.

DETAILED DESCRIPTION OF THE INVENTION

Figure 1:
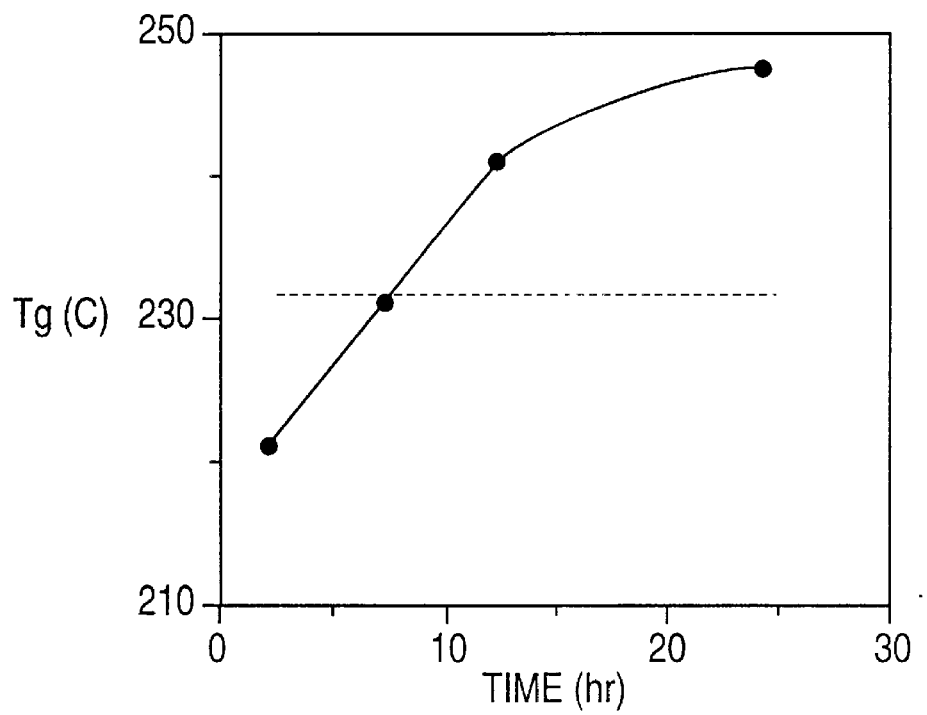
FIG. 1 shows a curved line illustrating the relation between glass transition temperature and polycondensation time of the polyamideamic acid.

The present invention relates to polyamideamic acid resin prepolymers represented by formula A having isophorone diamine

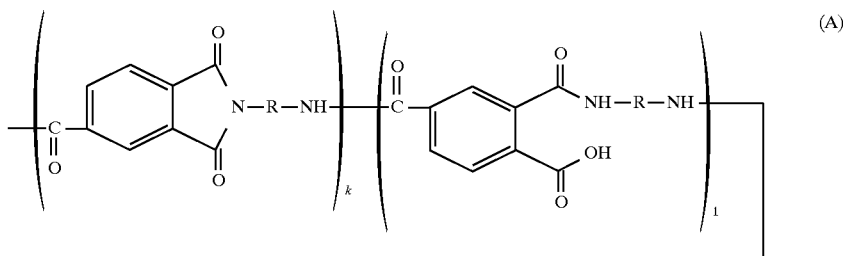

(A)

in which k, l, m and n are integer of 1 or more, respectively, and $$0.1 < \frac{k+m}{k+l+m+n} < 0.9,$$

—R— is at least one group selected from the group consisting of

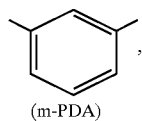

(m-PDA)

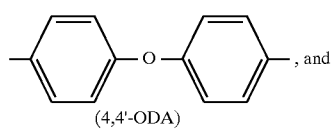, and (4,4'-ODA)

-continued

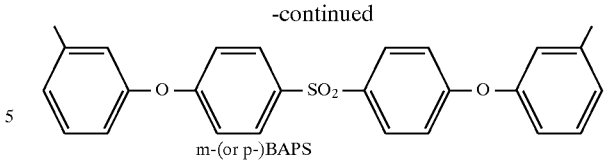

m-(or p-)BAPS

—R'— is a cis- and trans-conformational mixture of

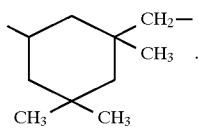

The polyamideamic acid prepolymer can be produced by solution polymerization of meta-phenylene diamine, oxydianiline, meta-bisaminophenoxy diphenylsulfone and para-bisaminophenoxy diphenylsulfone represented by formula IV, V, VI and VII, respectively,

 (IV)

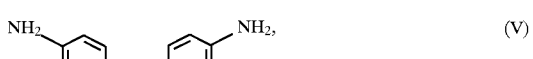 (V)

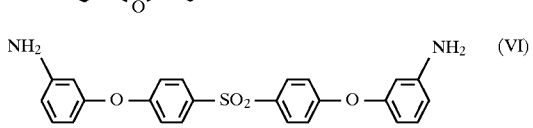 (VI)

(VII)

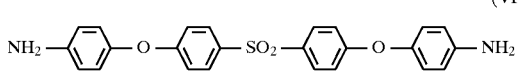

as an aromatic diamine component and isophorone diamine (used as monomer of conventional polyurethane resins and epoxy resins) represented by formula VIII

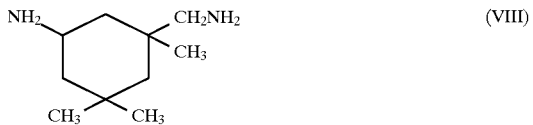 (VIII)

as an aliphatic diamine component with trimellitic acid anhyride chloride as an acid derivative to synthesize a polyamideamic acid, and then adjusting imidization time by adding acetic anhyride/pyridine as imidization catalyst to obtain polyamideamic acid resin prepolymer A wherein the degree of imidization is controlled.

The present invention also relates to the above mentioned process.

In the above reaction, the condensation reaction between diamine and trimellitic acid anhydride chloride is carried out at temperatures of 0° C. to 10° C. in the presence of triethylamine as an acid acceptor.

Isophorone diamine which is alicyclic diamine is used as one of monomers in the present invention since it has many merit in that it has good solubility in organic solvent, heat resistance owing to its bulky cyclic structure, low cost and ease of purifying monomer, and thus is expected to contribute to the improvement of physical properties and cost reduction.

Isophorone diamine consists of alicyclic structure, which can give flexibility without decreasing heat resistance as compared to conventional fully aromatic polyamideimides resin, and is highly expected to contribute to the decrease of melt viscosity since packing density is decreased due to three methyl substituents.

The polyamideamic acid resin prepolymer prepared by the present process can be formed into high heat resistant foam in uniform shape by pulverlyzing the prepolymer in uniform size and heating the obtained powder under pressure to carry out the foaming process as shown in the following reaction scheme:

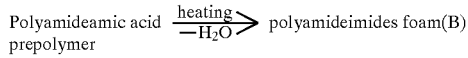

The production of most of polyimides foams until now has been performed by the both foaming process and polymerization process at the same time by heating low molecular weight oligomer in a microwave oven. In this process, heat treatment in microwave oven tends to be local heating due to nonhomogeniety of microwave, and thus generated local heat treatment come to overheat the core part of the resin, resulting in partial polymerization reaction and imidization reaction. Besides, the dielectric constant in melted part wherein imidization reation is proceeded to some extent increases by the presence of water which is byproduct of reaction, and with the increase of absorption of microwave the local heating may be accelerated. Accordingly, it requires high level of technology and experience to prepare uniform polyimides foams from oligomer polyimides resins reproductively.

On the other hand, polyamideamic acid resin prepolymer prepared by the present invention can be melted under high temperature and pressure and have melt viscosity suitable for foaming, in spite of having high molecular weight. Therefore, it can be easily formed into foams in uniform shape by using inexpensive instrument compared with the process for preparing conventional polyimides foam.

The present invention also relates to a process for preparing polyamideimides foams which comprises i) pulverizing the polyamideamic acid resin prepolymer(degree of imidization: 10 to 90%) into size of 400 μm, ii) laminating the obtained polyamideamic acid powder in mold uniformly and then compressing to the maximum, and iii) placing the compressed polyamideamic acid mass in two hot presses and foaming under high pressure(300 kg/cm²).

The glass transition temperature of polyamideimides foams prepared by the present process is 270° to 320° C. and density thereof is in the range of 0.1 to 0.5 g/cm³.

The high heat resistant polyamideimides foams prepared by the present process are insoluble in organic solvents such as dimethylformamide, dimethyl acetamide and N-methylpyrrolidone and have excellent heat stability. The glass transition temperature of the foams subjected to post-heat treatment is 270° to 320° C., which show equal or higher heat stability than those of fully aromatic polyamideimides resins. The present prepolymers also show glass transition temperature increasing effect by 30° to 100° C. compared with those of polyetherimides foams commercially available at present. Furthermore, the foaming process can be performed by inexpensive equipment without using microwave oven to produce uniform foams reproductively.

Now, the present invention will be described more specifically with reference to examples hereafter, however it should be noted that the present invention is not intended to be restricted within those specific examples.

EXAMPLE 1

20.4 g(0.12 mole) of isophorone diamine and 56 g(0.28 mole) of oxydianiline were dissolved with nitrogen gas being passed slowly through in 580 g dimethylacetamide in a 1 liter reactor equipped with a stirrer, a temperature regulator, a nitrogen inlet, a dropping funnel and a condenser. To the solution was added slowly 84 g(0.4 mole) of trimellitic acid anhydride chloride while the internal temperature of the reactor was maintained at 0° to 10° C. using temperature regulator. The reaction mixture was stirred at room temperature over 3 hours to carry out solution polycondensation reaction and then 44 g(0.44 mole) of triethylamine was added to remove acid component generated. After the polymerization is completed, the reaction mixture was poured to excess methanol to precipitate polymer. The obtained solid product was separated by filtration, washed several times with water and methanol, and then dried in a vacuum drier at 80° C. for 12 hours to give a polymer(P-I) as a yellow powder. The inherent viscosity as measured on a solution of dimethylacetamide at a concentration of 0.5 g/dL at 30° C. was 0.20 dL/g. The glass transition temperature measured by a differential scanning calorimeter(DSC) was 228° C.

EXAMPLE 2

The procedure of Example 1 was repeated except that polycondensation was carried out for 4 hours. The inherent viscosity as measured on a solution of dimethylacetamide at a concentration of 0.5 g/dL at 30° C. was 0.25 dL/g. The glass transition temperature was 231° C.

EXAMPLE 3

The procedure of Example 1 was repeated except that polycondensation was carried out for 5 hours. The inherent viscosity of the obtained polymer(P-III) as measured on a solution of dimethylacetamide at a concentration of 0.5 g/dL at 30° C. was 0.35 dL/g. The glass transition temperature was 254° C.

EXAMPLE 4

The procedure of Example 1 was repeated except that polycondensation was carried out for 7 hours. The inherent viscosity of the obtained polymer(P-IV) as measured on a solution of dimethylacetamide at a concentration of 0.5 g/dL at 30° C. was 0.38 dL/g. The glass transition temperature was 256° C.

EXAMPLE 5

The procedure of Example 1 was repeated except that polycondensation was carried out for 24.0 hours. The inherent viscosity of the obtained polymer(P-V) as measured on a solution of dimethylacetamide at a concentration of 0.5 g/dL at 30° C. was 0.40 dL/g. The glass transition temperature was 257° C.

EXAMPLE 6

The procedure of Example 5 was repeated except that 160 ml of acetic acid anhyride and 160 ml of pyridine were added as reaction catalysts for imidization of polyamideamic acid and imidization reaction was continuously carried out for 12 hours. The inherent viscosity of the obtained polymer (P-VI) as measured on a solution of dimethylacetamide at a concentration of 0.5 g/dL at 30° C. was 0.38 dL/g. The glass transition temperature was 268° C.

EXAMPLE 7

The procedure of Example 6 was repeated except that imidization reaction was carried out for 24 hours. The inherent viscosity of the obtained polymer(P-VII) as measured on a solution of dimethylacetamide at a concentration of 0.5 g/dL at 30° C. was 0.44 dL/g. The glass transition temperature was 268° C. The results of preparation are shown in Table 2.

EXAMPLE 8

The polyamideamic acid prepolymer P-II(degree of imidization: 24%, inherent viscosity: 0.25 dL/g) prepared in Example 2 was pulverized into uniform powder of 400 μm. The obtained powder was placed in hot press preheated to 200° C., compressed and then foaming process was carried out with temperature increased up to 300° C. The pressure was applied up to 250 kg/cm$^2$ and foaming time was adjusted in the ranges of 1 to 5 minutes.

Flexible foam having density of 0.15 g/cm$^3$ and uniform cell structure was prepared.

EXAMPLE 9

The procedure of Example 8 was repeated except that prepolymer (P-VI) was used and foaming process was carried out at 330° C.

Rigid foam having density of 0.38 g/cm$^3$ and uniform cell structure was prepared.

EXAMPLE 10

The procedure of Example 8 was repeated except that prepolymer (P-VII) was used and foaming process was carried out at 330° C. Foaming process was not proceeded, and transparent sheet was formed.

EXAMPLE 11

To increase heat resistance of foam F-1 prepared in Example 8, post heat treatment was carried out in an oven preheated to 300° C. for about 1.0 hour. Thus obtained foam had glass transition temperature of 282° C.

EXAMPLE 12

The procedure of Example 11 was repeated except that post heat treatment time was increased to 2.0 hours. The obtained foam had glass transition temperature of 283° C.

<Change of Molecular Weight of Polyamideamic Acid With Reaction Time>

The change of molecular weight of polyamideamic acid with the lapse of polycondensation time was observed during the preparation of polyamideamic acid consisting of trimellitic acid anhydride chloride/oxydianiline/isophorone diamine(10/7/3). This is essential in order to carry out the experiment reproductively because melt viscosity of resin or aspect of forming foam are varied according to the molecular weight or degree of imidization of polyamideamic acid.

Table 1 below shows the relation between polycondensation time and glass transition temperature of the obtained polymer. As seen from Table 1, glass transition temperature increased as the reaction time increased. After 24 hours glass transition temperature was maintained almost constant. At this point molecular weight of polymer was found to be maximum. As seen from Table 2, inherent viscosity of resin also was found to be maximum after 24 hours of polycondensation.

TABLE 2

Preparation of polyamideamic acid containing isophorone diamine

| Pre-polymer | Ex. No. | Poly condensation time (hr) | Inherent viscosity (dL/g) | Tg[1] (°C.) | Precipitation solvent |
|---|---|---|---|---|---|
| P-I | Ex. 1 | 3.0 | 0.20 | 228 | methanol |
| P-II | Ex. 2 | 4.0 | 0.25 | 231 | methanol |
| P-III | Ex. 3 | 5.0 | 0.35 | 254 | methanol |
| P-IV | Ex. 4 | 7.0 | 0.38 | 256 | methanol |
| P-V | Ex. 5 | 24.0 | 0.40 | 257 | methanol |
| P-VI | Ex. 6 | 24.0(12.0)[2] | 0.38 | 268 | methanol |
| P-VII | Ex. 7 | 24.0(24.0) | 0.44 | 264 | methanol | footnote:
[1]Glass transition temperature
[2]Imidization reaction time

<Relation Between Imidization Time and Degree of Imidization>

As mentioned above, the degree of imidization is one of very important factors in the production of foams.

The degree of imidization of polyamideamic acids produced in the present invention was measured by infrared spectroscopy. As well known, the degree of imidization was determined by comparing one of bands at 1780 cm$^{-1}$ (symmetrical stretch C=O), 1380 cm$^{-1}$(C—N stretch), 725 cm$^{-1}$(bending of C=O) as characteristic bands of imide group with bands of aromatic absorption (1500 and 1015 cm$^{-1}$). Generally, in the case of imidization by heat treatment, when bands of 1780 cm$^{-1}$ or 725 cm$^{-1}$ are used as comparative bands, some error in determination of the degree of imidization may occur due to the presence of acid anhyride formed by reequilibrium reaction. However, in the present invention, since degree of imidization was measured after chemical imidization using acetic anhyride/pyridine catalysts, acid anhyride was not formed. Therefore, it was considered that the use of band at 1780 cm$^{-1}$ as comparative band would cause no problem. The sample which was cured at 200° C. for 1 hour, at 250° C. for 1 hour and at 300° C. for 0.5 hour was used as a standard sample having 100% of degree of imidization and the absorbances of characteristic bands were measured by the heights of bands.

The degree of imidization was measured by comparing the intensity of absorption bands at 1780 cm$^{-1}$ and 1015 cm$^{-1}$.

$$\text{degree of imidization (\%)} = \frac{(A_{1780}/A_{1015}) \text{ sample}}{(A_{1780}/A_{1015}) \text{ standard sample}} \times 100$$

Figure 2:
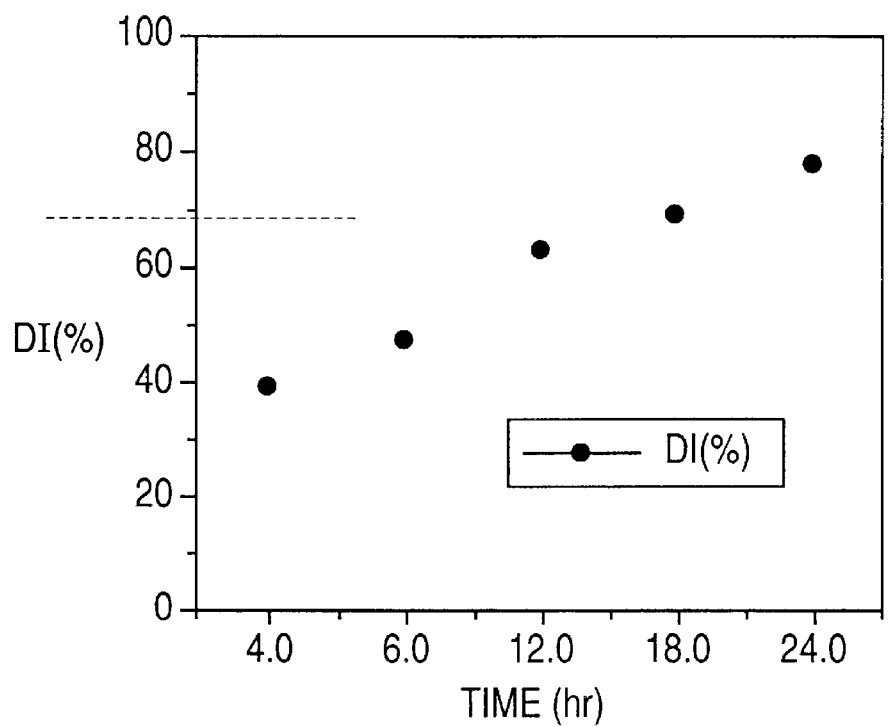
FIG. 2 shows the relation between imidization time and degree of imidization.

FIG. 2 shows the change of degree of imidization with time after adding acetic anhyride/pyridine as imidization catalyst to polyamideamic acid solution. It has been found that degree of imidization was increased as the reaction time increased.

<Production of Novel Polyamideimide Foam>

Figure 3B:
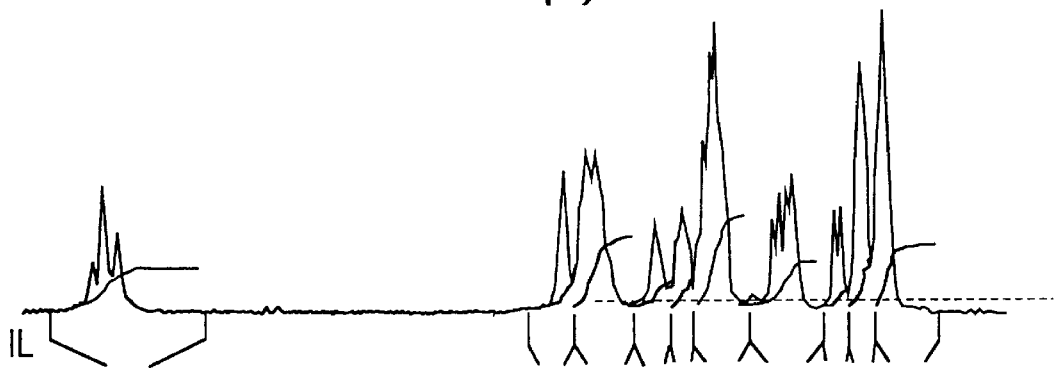
FIG. 3 shows nuclear magnetic resonance spectra of polyamideamic acid and foam prepared therefrom.
Figure 3A:
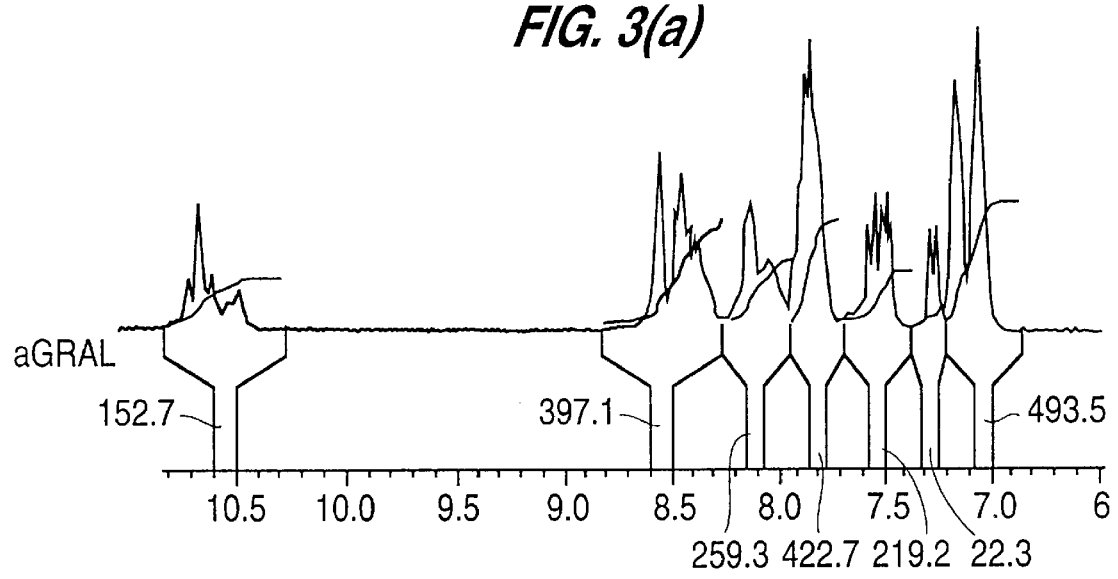

FIG. 3 shows the nuclear magnetic resonance spectra of the prepolymer(P-IV) and F-2 foam prepared therefrom according to the present invention.

In the case of spectrum(a) of P-VI in the state of prepolymer before foaming process, there are three peaks of amide hydrogen of polyamideimides resin at vicinity of 10.6 ppm while there are peaks of amide hydrogen of polyamideamic acid at vicinity of 10.5 to 10.4 ppm. Accordingly, it has been found that imidization reaction in the polymer is not completed yet, which is similar from the result of infrared spectroscopy(the degree of imidization:63.6%). In the case of spectrum(b) of F-2 foam which was produced under pressure at 330° C. from the prepolymer, however, peaks of benzene ring hydrogen of polyamideimides appear clearly at vicinity of 8.53 to 7.93 ppm while peaks at 10.5 to 10.4 ppm(amide hydrogen of polyamic acid), 8.36, 8.06 ppm (benzene ring hydrogen of trimellitic acid moiety in the state of polyamic acid) being disapperared. Therefore, it has been found that the imidization reaction was carried out under high temperature and pressure, and foams were produced by water vapor which was byproduct of imidization.

In the present invention, in order to assess the effect of the degree of imidization of polyamideimides resin on the structure of foam, foams were produced by using prepolymers having different degree of imidization, and the results were evaluated.

As seen from table 3, the lesser the degree of imidization, the lesser is the density of foam. This is due to the the amount of water vapor acting as foaming agent in the foaming process. In the case of prepolymer having low degree of imidization, a lot of water vapor was produced by the imidization reaction in the production of foam, so that a great many bubbles were generated. As a result, the density of foam decreased. On the contrary, in the case of prepolymer(P-VI) having degree of imidization of 79.6%, foam was scarecely produced, but transparent sheet was produced.

TABLE 3

Preparation of novel polyamideimide foams

| Ex. No. | Foam | Pre-polymer | Imidization time (hr) | Degree of imidization of prepolymer | Density of foam (g/cm³) | state |
|---|---|---|---|---|---|---|
| 8 | F-1 | P-II | 0.0 | 24.3 | 0.15 | Flexible foam |
| 9 | F-2 | P-VI | 12.0 | 63.6 | 0.38 | Rigid foam |
| 10 | F-3 | P-VII | 24.0 | 79.6 | — | transparent sheet |

$$*\text{degree of imidization (\%)} = \frac{(A_{1780}/A_{1015}) \text{ sample}}{(A_{1780}/A_{1015}) \text{ standard sample}} \times 100$$

Standard sample: film produced by curing polyamic acid solution at 70° C. in vacuum for one hour, at 200° C. for one hour, at 250° C. for one hour and at 300° C. for 0.5 hour.

<Effect of Post Heat Treatment>

Post heat treatment was carried out in an oven preheated to 300° C. with time change to increase the heat resistance of foam prepared. The results were summarized in table 4. As seen from table 4, the glass transition temperatures of foams were increased as the time of post heat treatment increased. The maximum glass transition temperature was about 283° C., which showed much better heat resistance than that of fully aromatic polyamideimide resin.

TABLE 4

Relation between heat treatment time and glass transition temperature

| Ex. No. | Foams | Heat treatment Time (Hr) | Glass transition temperature (°C.) |
|---|---|---|---|
| 8 | F-1 | — | 264.0 |
| 11 | F-1(1) | 1.0 | 282.1 |
| 12 | F-1(2) | 2.0 | 283.2 |

<Relation Between Degree of Imidization and Cell Structure of Foam>

Figure 4A:
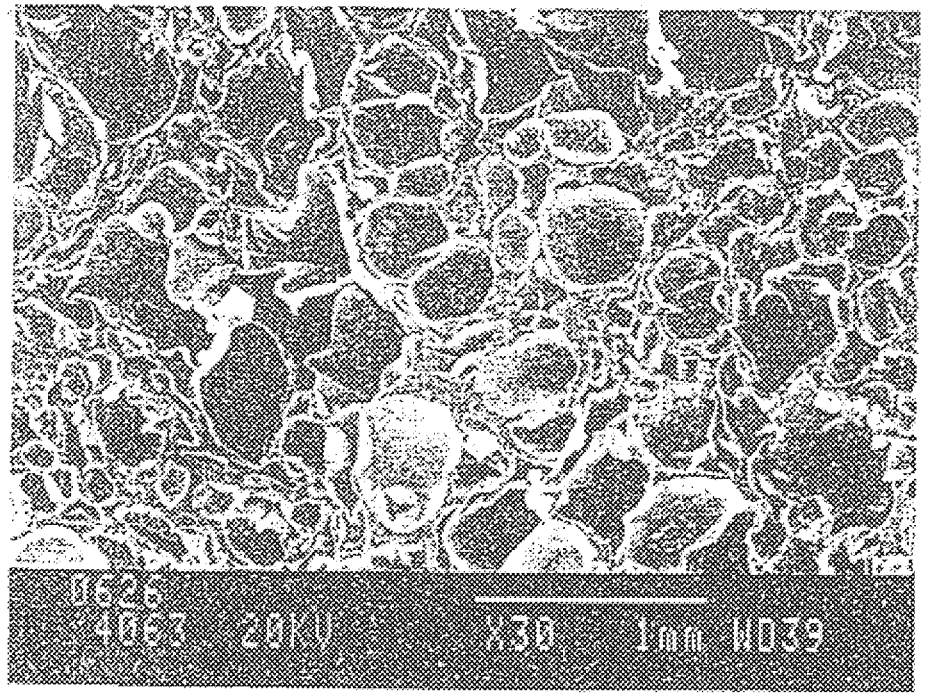
FIG. 4 shows scanning electron microscopic photogragh of the foam F-1.
Figure 4B:
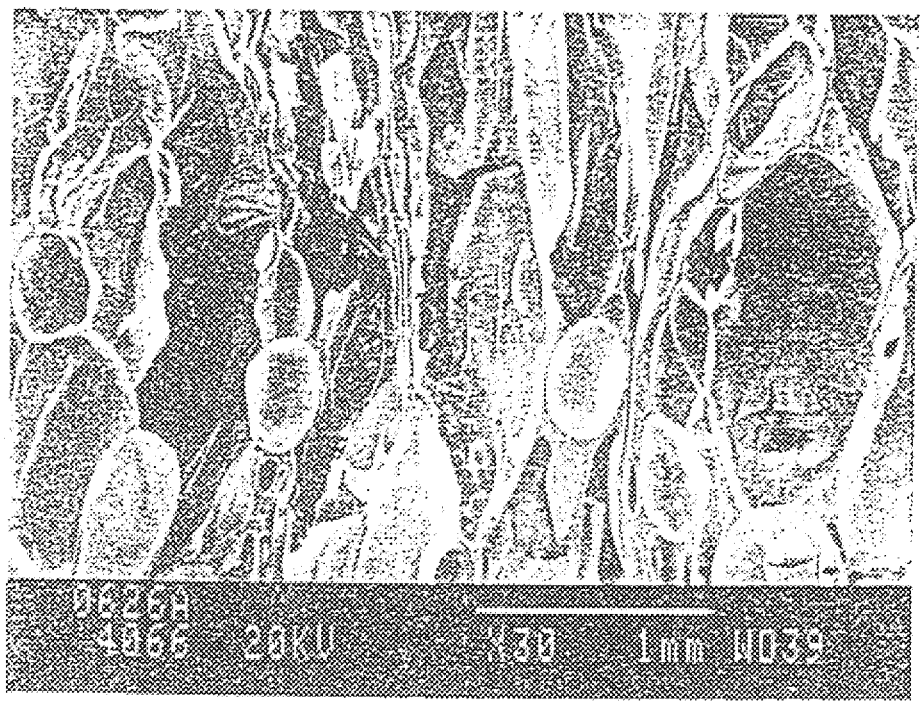
Figure 5A:
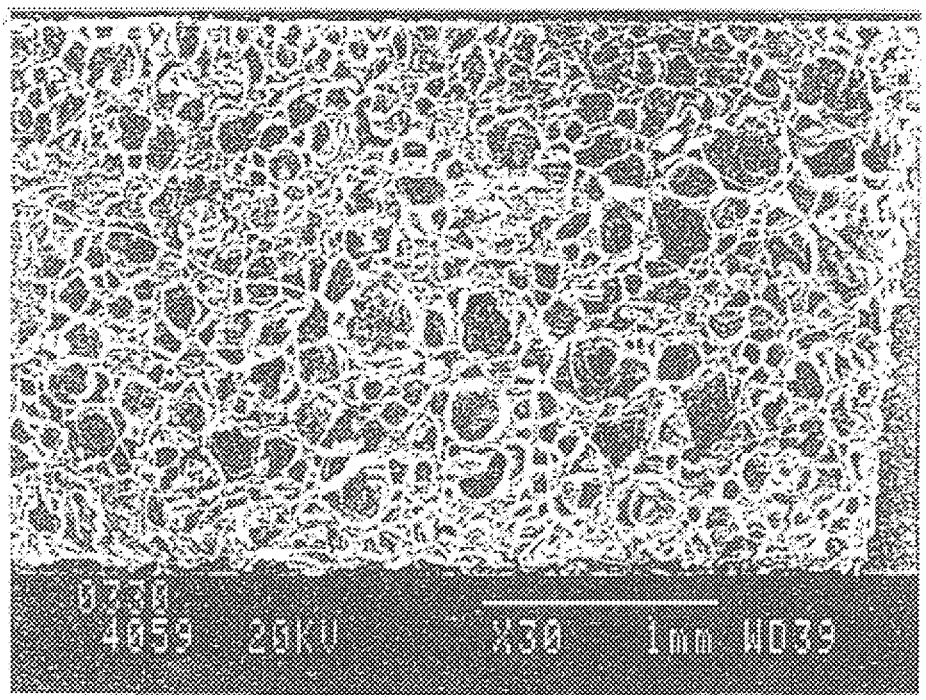
FIG. 5 shows scanning electron microscopic photogragh of the foam F-2.
Figure 5B:
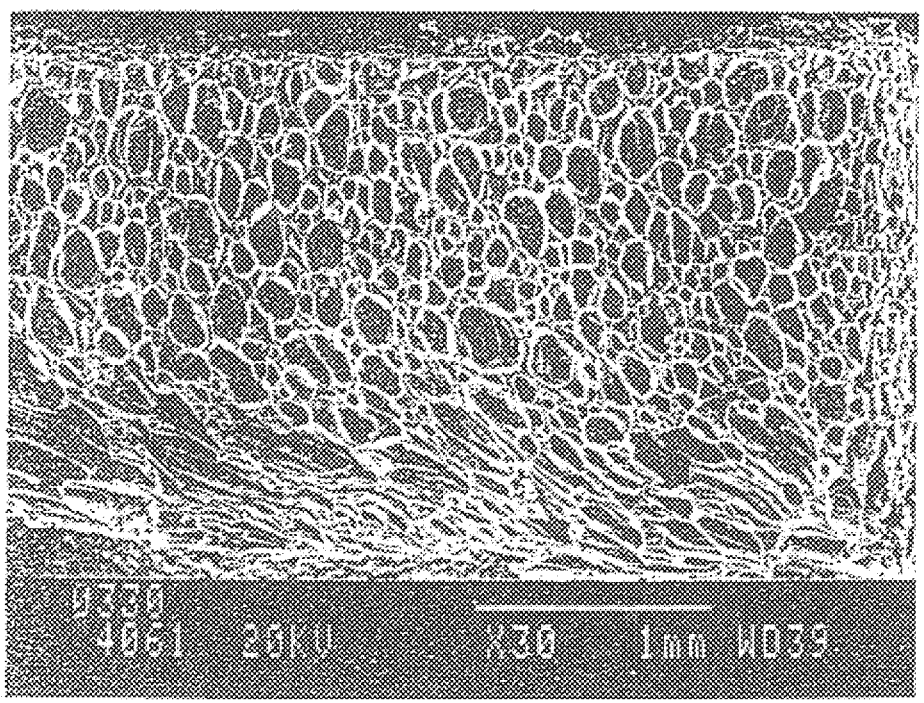

FIGS. 4 and 5 show scanning electromicroscopic photographs of foams prepared by the present invention. In the case of FIG. 4 illustrating scanning electromicroscopic photograph of foam(F-2) prepared from prepolymer having degree of imidization of 63.6%, cell structures at foam generation direction and side direction were relatively uniform. On the contrary, in the case of FIG. 5 of foam (F-1), cell structures at foam direction and side direction were different from each other. It was because before the production of foam the degree of imidization of prepolymer was very low, so that water vapor acting as a foaming agent was produced abruptly. Polyamideimide foams prepared by the present invention were very tough and had excellent mechanical strength compared with those of conventional polyimides foams.

What is claimed is:

1. A process for producing polyamideimide foam which comprises:

a.) preparing a polyamidamic acid resin prepolymer by reacting an aromatic diamine component selected from the group consisting of meta-phenylene diamine, oxydianiline, meta-bisaminophenoxy diphenylsulfone, and para-bisaminophenoxy diphenylsulfone, and an isophorone diamine component, with trimellitic acid anhydride chloride to form a polyamidamic acid resin prepolymer having the formula

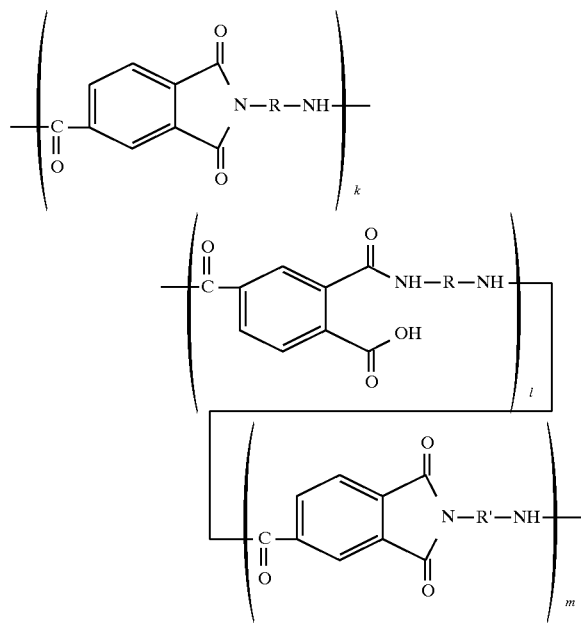

-continued

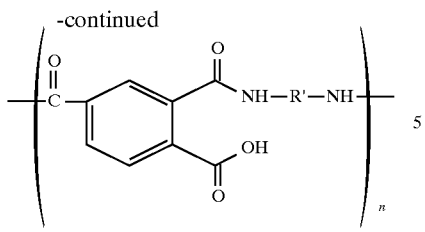

in which k, l, m, and n are integers having a value of at least 1, respectively, and $$0.1 < \frac{k+m}{k+l+m+n} < 0.9,$$

R is at least one group selected from the group consisting of

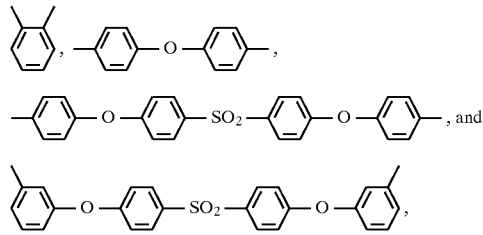

and

R' is a cis- and trans-conformational mixture of a radical having the formula

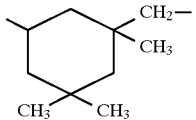

b.) pulverizing said polyamidamic acid resin prepolymer, c.) introducing a layer of said pulverized prepolymer into a closed mold, and d.) heating said pulverized prepolymer in said closed mold under superatmospheric pressure.

2. A process for producing polyamideimide foam according to claim 1, wherein said polyamideimide foam is produced at a temperature of 250° C. to 350° C. under pressure of 50 to 300 kg/cm².

3. A polyamideimide foam produced by the process according to claim 1.

4. A polyamideimide foam according to claim 3 having a density of 0.10 to 0.50 g/cm³.

5. A polyamideimide foam according to claim 3 having a glass transition temperature of 250° C. to 300° C.

6. A polyamideimide foam according to claim 3 having, after heat treatment, a glass transition temperature of 270° C. to 320° C.

* * * * *